(12) United States Patent
Balkenhol

(10) Patent No.: US 12,085,179 B2
(45) Date of Patent: Sep. 10, 2024

(54) SAFETY VALVE

(71) Applicant: GEA FARM TECHNOLOGIES GMBH, Bönen (DE)

(72) Inventor: Reinhard Balkenhol, Paderborn (DE)

(73) Assignee: GEA Farm Technologies GmbH, Bönen (DE)

( * ) Notice: Subject to any disclaimer, the term of this patent is extended or adjusted under 35 U.S.C. 154(b) by 0 days.

(21) Appl. No.: 17/766,839

(22) PCT Filed: Oct. 7, 2020

(86) PCT No.: PCT/EP2020/078091
§ 371 (c)(1),
(2) Date: Apr. 6, 2022

(87) PCT Pub. No.: WO2021/073969
PCT Pub. Date: Apr. 22, 2021

(65) Prior Publication Data
US 2024/0060571 A1 Feb. 22, 2024

(30) Foreign Application Priority Data
Oct. 18, 2019 (DE) ...................... 10 2019 128 235.7

(51) Int. Cl.
*F16K 17/04* (2006.01)
(52) U.S. Cl.
CPC .................................. *F16K 17/04* (2013.01)
(58) Field of Classification Search
CPC .... A01J 5/01; Y10T 137/86517; F16K 17/04; F16K 1/446; F16K 11/04; F16K 11/022; F16K 11/027
See application file for complete search history.

(56) References Cited

U.S. PATENT DOCUMENTS 2,629,606 A * 1/1953 Stuart ...................... F16K 1/446
137/630
4,360,039 A * 11/1982 Jeppsson ................. F16K 37/00
137/614.19
(Continued)

FOREIGN PATENT DOCUMENTS

DE 102013114595 A1 6/2015
GB 757276 A 9/1956

OTHER PUBLICATIONS

International Search Report mailed Dec. 18, 2020 in related/corresponding International Application No. PCT/EP2020/078091.
(Continued)

*Primary Examiner* — Reinaldo Sanchez-Medina
*Assistant Examiner* — Nicole Gardner
(74) *Attorney, Agent, or Firm* — PATENT PORTFOLIO BUILDERS PLLC

(57) ABSTRACT

A safety valve includes an inlet, an outlet, two shut-off valves arranged behind one another, and a discharge valve with a discharge outlet. The two shut-off valves and the discharge valve are connected by an inlet and outlet respectively. The safety valve has a housing main body, relative to which a piston is guided movably, and which has a housing cover guided movably on a side lying opposite the housing main body. The inlet is arranged on the piston, the outlet is arranged on the housing cover, each of which merges into a bore closeable by one sealing surface arranged on the piston and the housing cover respectively. The housing cover and the housing main body form a cavity, in which the bores end. A circumferential gap formed when the housing cover is lifted off produces the discharge outlet.

12 Claims, 13 Drawing Sheets

(56) References Cited

U.S. PATENT DOCUMENTS

| | | | | |
|---|---|---|---|---|
| 4,552,167 A | * | 11/1985 | Brakelmann | ........... B67C 3/001 137/240 |
| 4,605,035 A | * | 8/1986 | Rasmussen | ............. F16K 1/446 137/614.19 |
| 6,178,986 B1 | * | 1/2001 | Burmester | .............. F16K 1/446 137/240 |
| 6,244,291 B1 | | 6/2001 | Hughes | |
| 10,502,330 B2 | | 12/2019 | Balkenhol | |
| 2015/0173320 A1 | | 6/2015 | Balkenhol et al. | |

OTHER PUBLICATIONS

Search Report created Jun. 30, 2020 in related/corresponding DE Application No. 10 2019 128 235.7.
Written Opinion mailed Dec. 18, 2020 in related/corresponding International Application No. PCT/ EP2020/078091.

* cited by examiner

SAFETY VALVE

BACKGROUND AND SUMMARY OF THE INVENTION

Exemplary embodiments of the invention relate to a safety valve having an inlet, an outlet, two shut-off valves arranged one behind the other, and a discharge valve having a discharge outlet, wherein the two shut-off valves and the discharge valve are connected to one another in each case by way of an inlet and outlet, respectively, and wherein in a passage position both shut-off valves are open and the discharge valve is closed and in a shut-off position both shut-off valves are closed and the discharge valve is open.

Such safety valves or safety valve assemblies are used when, in the shut-off position of the valve, it must be ensured with a high level of fault tolerance that a medium supplied to the inlet cannot reach the outlet. The high safety level is achieved on the one hand by the redundant use of the shut-off valves, which are connected in series between the inlet and outlet, and on the other hand by the discharge valve. Even if one of the shut-off valves should become permeable in the shut-off state, any medium that has entered is drained out of the valve by the discharge valve and discarded.

Such valves, also known as block-bleed-block valves, are used, for example, in cleaning devices for milking systems, in particular automatic milking systems, for milk-producing animals, such as cows, sheep, goats. The high safety level of the block-bleed-block valve prevents cleaning liquid from penetrating into milk to be processed, which could be hazardous to health.

Often, the use of such safety valves in correspondingly sensitive applications is also legally required by relevant regulations and guidelines, for example the American FDA guideline. In addition to milking technology, general areas of application include food technology and production plants for medical products.

In addition to the arrangement of the shut-off valves and the discharge valve described at the beginning, an actuation sequence is also important in order to achieve the aforementioned safety. When changing from the open to the closed position, the shut-off valves must first be closed and then the discharge valve opened. Conversely, when moving from a shut-off position to an open position, the discharge valve must be closed first and then the shut-off valves must be opened. Adherence to these sequences of actuation also prevents undesirable and unnecessary amounts of processed media from being discharged during normal operation of the safety valve.

In principle, such a safety valve can be realized by an arrangement of three appropriately controlled valves, but this is material-intensive and thus costly due to the individual controllability of the valves, and requires a large installation space.

A safety valve of this type is known from DE 10 2013 114 595 A1, in which the individual valves are formed in a common valve block and in which only one actuator is required to operate the safety valve. This is achieved by using a hollow piston that closes valve openings with an outer surface and has a cavity through which the medium can be passed. In this way, the above-mentioned functionality can be achieved with a relatively simple design by moving the piston with only one actuator.

A disadvantage of the arrangement described, however, is that the piston on the side where it is actuated by the actuator must be sealed off from the optionally pressurized medium towards the outside by sliding seals. However, such a seal is susceptible to wear, which leads to high maintenance costs when the seal is replaced.

Exemplary embodiments of the present invention are therefore directed to a safety valve of the type mentioned above which, with a simple design, requires as few sliding sealing elements as possible.

A safety valve of the type mentioned at the beginning and in accordance with the invention comprises a housing main body, relative to which a piston is movably guided, and a housing cover that is movably guided on a side opposite the housing main body, wherein the inlet is arranged on the piston and the outlet on the housing cover, and merges in each case into a bore that can be closed by a sealing surface arranged in each case on the piston and the housing cover respectively. In this case, the housing cover and the housing main body form a cavity in which the bores end, wherein a circumferential gap which is formed when the housing cover is lifted off produces the discharge outlet.

The safety valve according to the invention thus has only two components that move relative to a main body. This is achieved by the inlet or outlet being formed in each case on one of the moving components itself, i.e., moving relative to the main body. As a rule, however, this does not restrict the usability of the safety valve, since the inlet or outlet are usually coupled to flexible hoses that can compensate for or follow this movement. Further, a respective sealing surface on the piston or the housing cover is used to close a bore in the respective other component, forming the two shut-off valves. The piston and housing cover each perform a dual function: they form the valve body and the sealing element, which minimizes the number of parts that have to be moved relative to each other. In addition, this simplifies replacement of the sealing elements, which are otherwise difficult to access, and eliminates the need for wear-prone sliding seals.

It is noted that the discharge outlet, which opens the cavity to the environment, is an outlet through which medium is drained only when the medium carried by the safety valve is pressurized relative to the environment. If a medium that is depressurized relative to the surroundings is being fed, ambient air will be drawn in through the discharge outlet in the event of a leak in one of the shut-off valves. Even if in such an operating case the discharge outlet is an inlet, this is covered by the term "discharge outlet".

In an advantageous design of the safety valve, the piston moves in an opening of the housing main body and is connected to the housing main body by a diaphragm seal, which seals the cavity to the outside. The use of the diaphragm seal provides a maintenance-free and durable seal for the cavity.

In a further advantageous design, the piston is guided by guide rods in a direction perpendicular to one side of the housing main body. Preferably, the piston is pressed in the direction of the housing main body by spring force, wherein the springs can be arranged on the guide rods for their own guidance. In this way, only one drive acting in one direction is required for the piston—the other direction of movement is covered by the springs. This can also be achieved with regard to the housing cover by pressing it in the direction of the housing main body under spring force. In a mechanically simple and space-saving design, the springs are arranged in guide domes and press on the housing cover. As a result of the piston pressing with its sealing surface against the bore of the housing cover, when the piston is moved by the actuator, the housing cover is finally also moved and thus the discharge valve opens. The entire actuation of the safety valve can thus be performed by an actuator acting in one direction.

Particularly preferably, a spring force of the springs acting on the piston is greater than a spring force of the springs acting on the housing cover. This ensures that the discharge outlet of the safety valve is closed before the shut-off valves are opened during a transition to the open position or, conversely, remains closed until the shut-off valves close during a transition to the closed position.

Coil springs and/or gas springs can be used for both the piston and the housing cover.

In a further advantageous design of the safety valve, media-carrying components are made of stainless steel and/or plastic. Such a safety valve is particularly suitable for processing foodstuffs and meets applicable hygiene requirements in this area.

The described safety valve is particularly suitable for use in a milking device for milking a milk-producing animal. In particular, the compact and cost-effective design leads to the special suitability. Compactness and low costs are particularly advantageous in the case of individual teat milking in the milking process, where such safety valves are to be provided at various points in the milking device in quadruplicate (in the case of cows as milk-producing animals) or at least in duplicate (in the case of sheep or goats as milk-producing animals).

The described safety valve can also be used in other applications, in which case compactness and low cost are also advantageous.

BRIEF DESCRIPTION OF THE DRAWING FIGURES

The invention is explained in more detail below by means of exemplary embodiments with the aid of figures, wherein.

DETAILED DESCRIPTION

Figure 1:
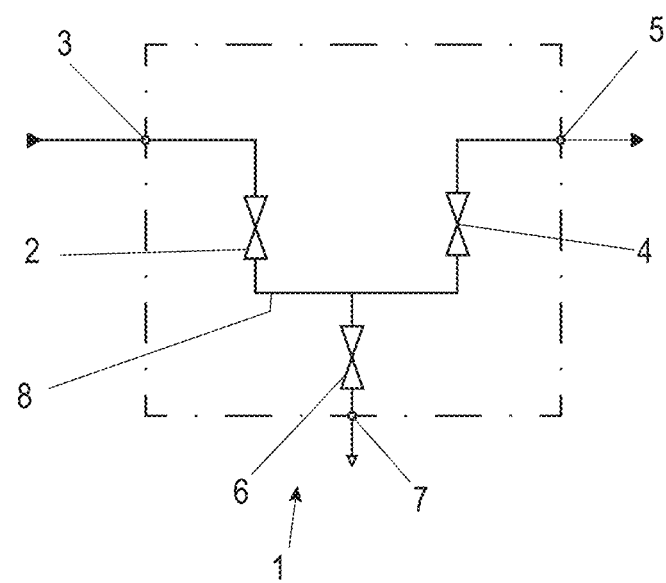
FIG. 1 shows a functional representation of a safety valve based on a block diagram.

FIG. 1 first shows the basic functional structure of a safety valve 1 in a block diagram. The functionality shown in FIG. 1 is basically known from the prior art and is also implemented in the safety valve 1 according to the application.

The safety valve 1 has a first shut-off valve 2 connected to an inlet 3 of the safety valve 1 and a second shut-off valve 4 connected to an outlet 5 of the safety valve 1. The two shut-off valves 2, 4 are each connected in series with a different one of their ports via an internal hydraulic connection 8. From this hydraulic connection 8, a discharge outlet 7 of the safety valve 1 is led out via a discharge valve 6.

The passage position or state of the safety valve 1 is hereinafter referred to as a state in which both shut-off valves 2, 4 are open and the discharge valve 6 is closed. The operating state of the safety valve 1 in which both shut-off valves 2, 4 are closed and the discharge valve 6 is open is referred to as the shut-off position or state.

During a transition either from the passage to the shut-off position or vice versa, the discharge valve 6 is preferably closed at least whenever at least one of the shut-off valves 2, 4 is open. In this way, an unintentional discharge of the medium to which the safety valve 1 is pressurized is prevented.

It is noted that the safety valve 1 is generally symmetrical in design, so that the functionality of inlet 3 and outlet 5 can also be interchanged or the safety valve 1 can be used bidirectionally if required. The fact that a distinction is made between inlet 3 and outlet 5 in the context of this application is merely due to a clearer presentation.

An exemplary embodiment of a safety valve 1 according to the application is shown in more detail in the following FIGS. 2a to 2d, 3a to 3c and 4a to 4c. The figures each show different views of the safety valve 1 in different operating states. FIGS. 2a to 2d show the safety valve 1 in the locked position in a side view (FIG. 2a), a top view of an upper side (FIG. 2d), and two sectional views (FIGS. 2b, 2c). The sectional view of FIG. 2b is a longitudinal section along the sectional line indicated in FIG. 2d. The sectional view in FIG. 2c is a longitudinal section along the sectional line indicated in FIG. 2a.

The safety valve 1 has a housing main body 10, relative to which a piston 11 and a housing cover 13 are displaceably guided. The housing main body 10 is approximately plate-shaped with an approximately square dimension in this embodiment (compare FIG. 2d), whereas the piston 11 and the housing cover 13 are essentially formed with a round cross-section.

The piston 11 is guided through a correspondingly likewise round opening in the housing main body 10, wherein this passage is sealed by a diaphragm seal 12 arranged concentrically to the piston 11. The diaphragm seal 12 is attached with an outer edge in a sealing manner to the housing main body 10 and with an inner edge in a sealing manner to the piston 11, and can have one or more concentric undulations through which the piston 11 can be moved in a longitudinal direction relative to the housing main body 10. The material of the diaphragm seal 12 may be rubber, an elastomer, or stainless steel.

The simpler feasibility of the diaphragm seal 12 necessitates the round cross-section of the piston 11 shown here. In principle, however, the piston 11 could also have other cross-sectional shapes, in particular an oval shape. To guide the piston 11, four guide rods 111 are arranged perpendicular to the housing main body 10 in the case shown. Springs 112 are positioned on the guide rods 111, which press the piston 11 in the direction of the housing main body 10.

The housing cover 13 is also spring-loaded in the direction of the housing main body 10. Guide domes 131 and springs 132 inserted therein are provided for this purpose. Since the piston 11 and the housing cover 13 are arranged on opposite sides of the housing main body 10, the housing cover 13 and the piston 11 are pressed towards each other by the springs 112, 132.

There is an actuator 14, in this case a pneumatic cylinder, which is arranged on the side of the piston 11 as seen from the housing main body 10. The actuator 14 is held at a fixed distance from the housing main body 10 via columns 15. The columns 15 extend through the housing main body 10 and are continued on the side of the housing cover 13 up to an end plate 16. The springs 132 for the housing cover 13 are supported on this end plate 16. An end plate 16 is also provided on the side of the actuator 14, on which the springs 112 for the piston 11 are supported.

A moving element, in this case a piston rod 141, of the actuator 14 is connected to the piston 11. When pressure is applied to the actuator 14 via a compressed air connection 142, the piston rod 141 is pulled away from the housing main body 10 and accordingly pulls the piston 11 against the force of the springs 112 out of the housing main body 10 away from the housing cover 13.

FIGS. 2a to 2d show the safety valve 1 in the aforementioned passage position, which is established due to the spring force of the springs 112 and 132 without the actuator 14 being actuated, i.e., in a state in which the actuator 14 is not pressurized with compressed air.

The inlet 3 of the safety valve 1 (compare FIG. 1) is led out of the side of the piston 11. Inside the piston 11, the inlet 3 is hydraulically connected to a bore 113 aligned parallel to the direction of movement of the piston 11. The outlet 5 of the safety valve 1 (compare FIG. 1) is arranged laterally on the housing cover 13. Inside the housing cover 13, the outlet 5 merges into a bore 133 also aligned parallel to the direction of movement of the housing cover 13. The bores 113, 133 end in the area of the housing main body 10.

The two bores 113, 133 each end eccentrically in the housing main body 10 and offset from one another, wherein a sealing surface 134 is arranged or formed on the housing cover 13 opposite the bore 113 and a sealing surface 114 is arranged or formed on the piston 11 opposite the bore 133. The positions of the sealing surfaces 114, 143 or of the ends of the bores 113, 133 are selected so that both bores 113, 133 are equally closed in the position of the elements shown. The bore 113 together with the sealing surface 134 forms the first shut-off valve 2, and the bore 133 together with the sealing surface 114 forms the second shut-off valve 4.

In the shut-off position of the safety valve 1 shown, the actuator 14 is not pressurized with compressed air, so that the position of the piston 11 and the housing cover 13 relative to the housing main body 10 results solely from the force effect of the springs 112, 132.

Advantageously, the compressive force of the springs 112 is greater than that of the springs 132. In the example shown, the same compression springs are used as springs 112 and springs 132, but four springs 112 act on the piston 11 and only two springs 132 on the housing cover 13. As a result, the piston 11 pushes into the housing main body 10 until the bores 113, 133 rest on the corresponding sealing surfaces 114, 134. Due to the greater compressive force of the springs 112, these then displace the arrangement of piston 11 and housing cover 13 further against the force of the springs 132 until the housing cover 13 is pressed against a stop. In the process, the housing cover 13 lifts off the housing main body 10. A circumferential gap is created between the two, forming a discharge outlet 7 as shown in FIG. 1. Due to the spring forces, the safety valve 1 thus assumes a state in which both shut-off valves 2, 4 are closed and the discharge valve 6 formed by the edge of the housing cover 13 and the housing main body 10 is open.

Figure 2A:
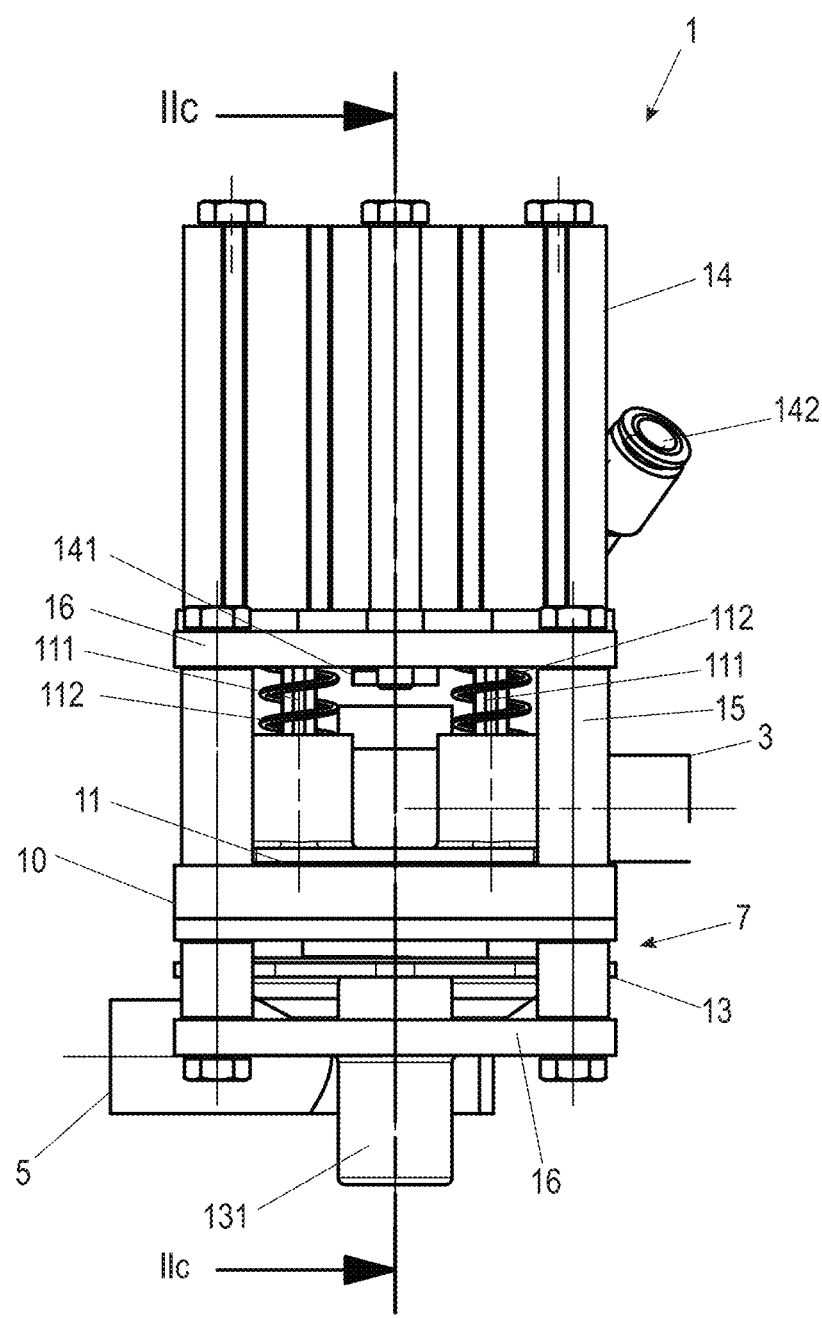
FIGS. 2a to 2d show different views of an exemplary embodiment of a safety valve in a shut-off position.
Figure 2B:
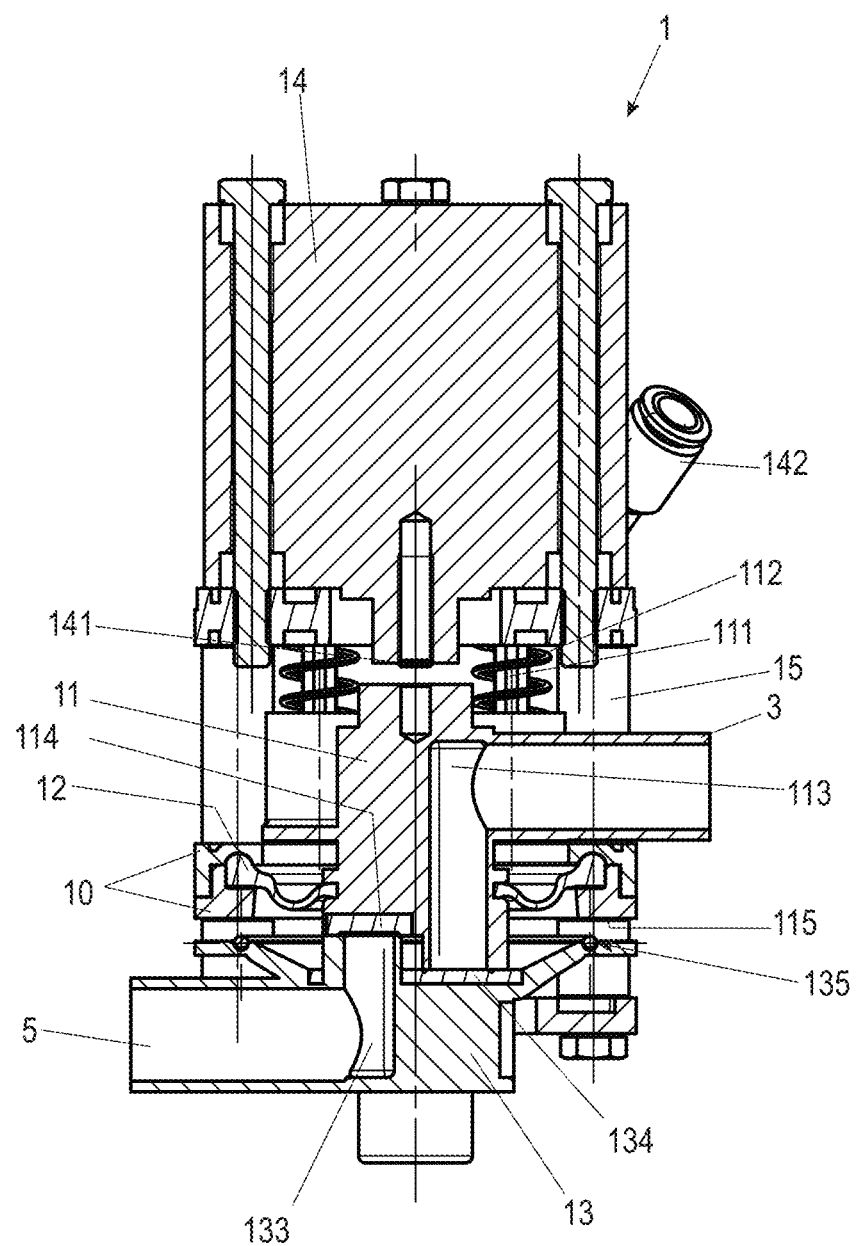
Figure 2C:
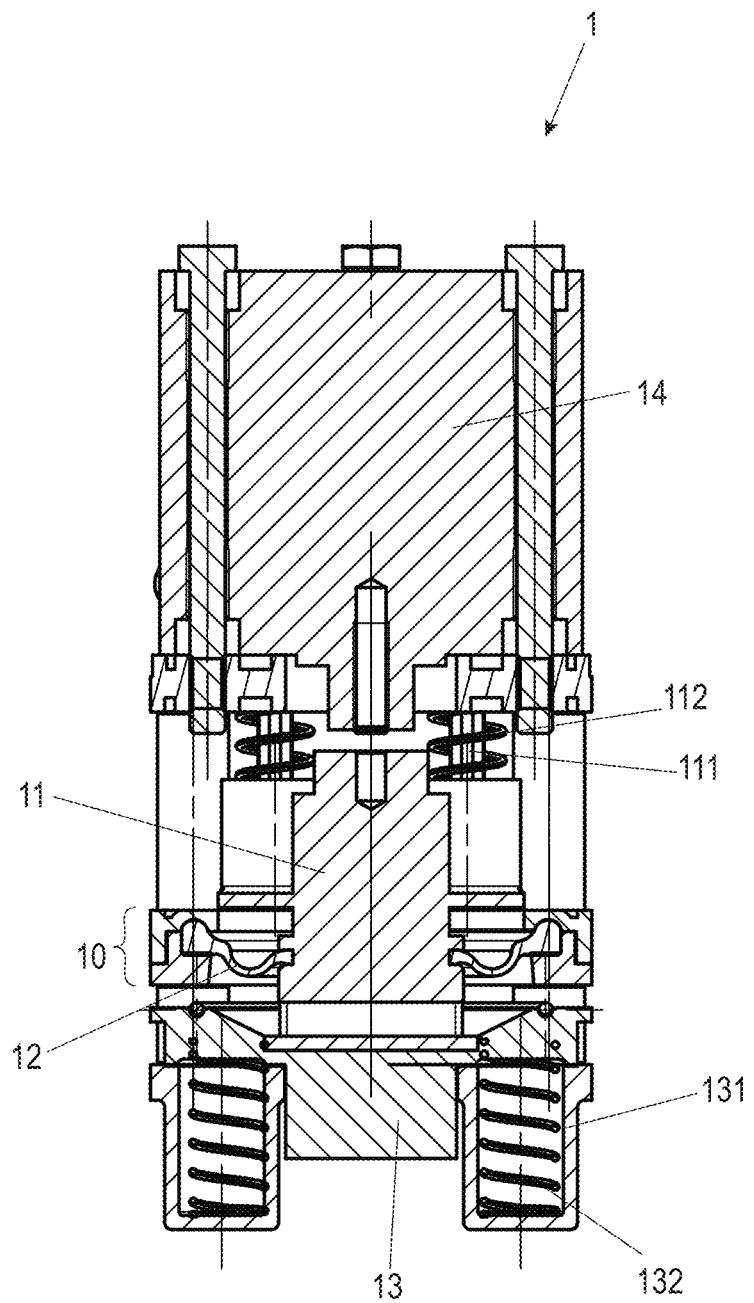
Figure 2D:
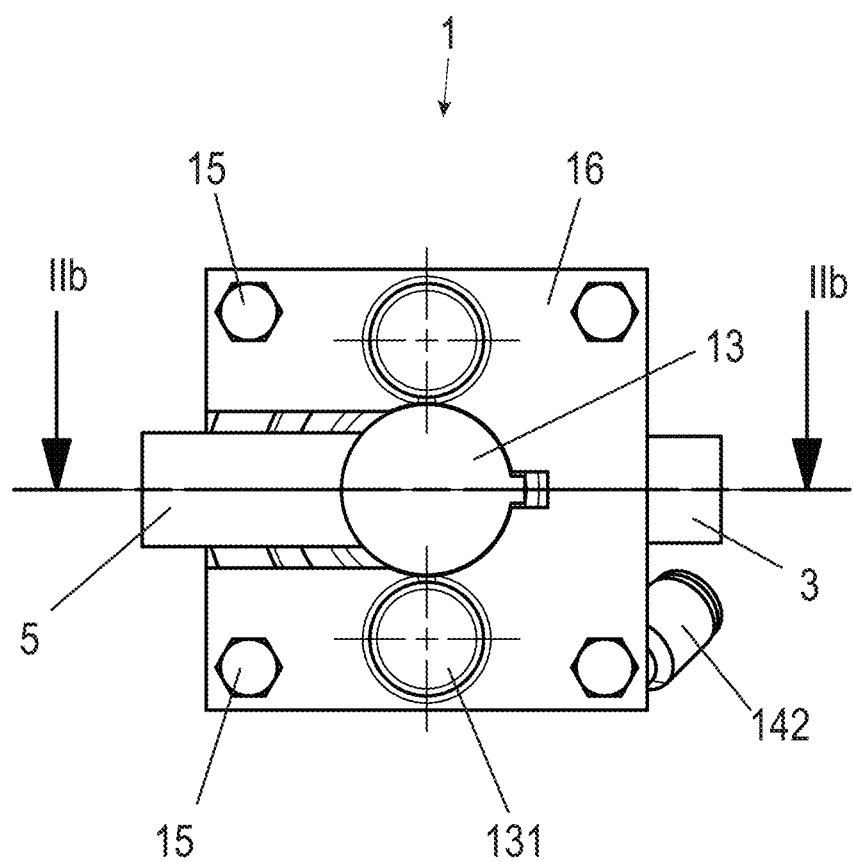
Figure 3A:
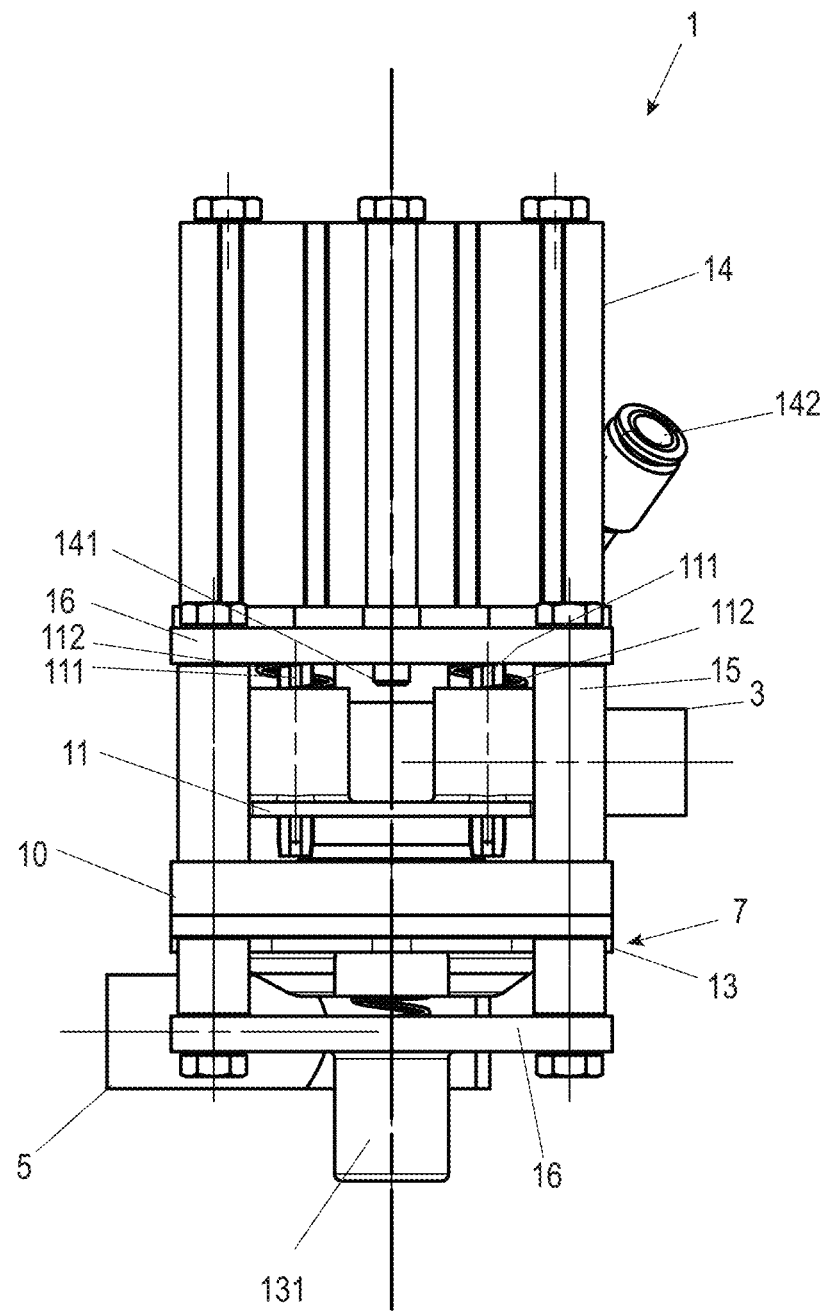
FIGS. 3a to 3c show different views of the safety valve of FIGS. 2a to 2d in a passage position.
Figure 3B:
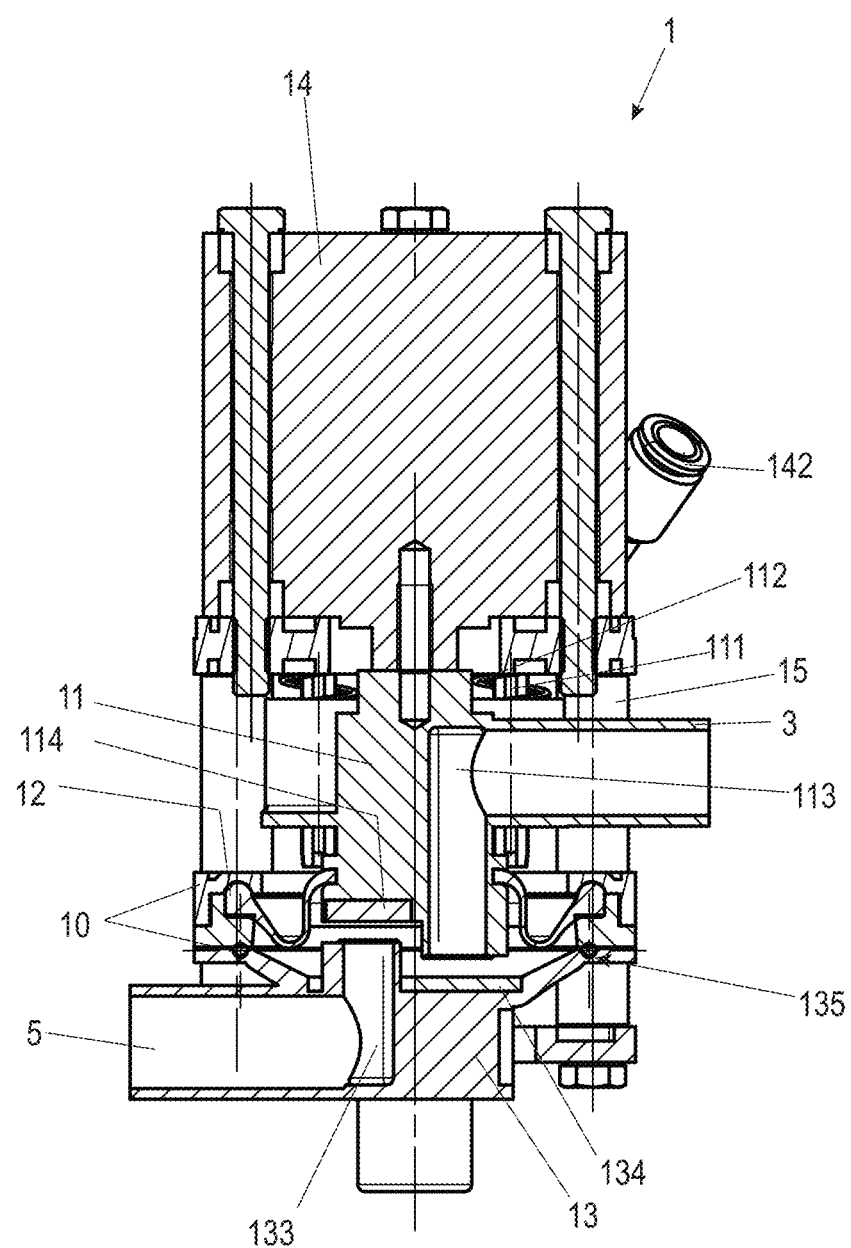
Figure 3C:
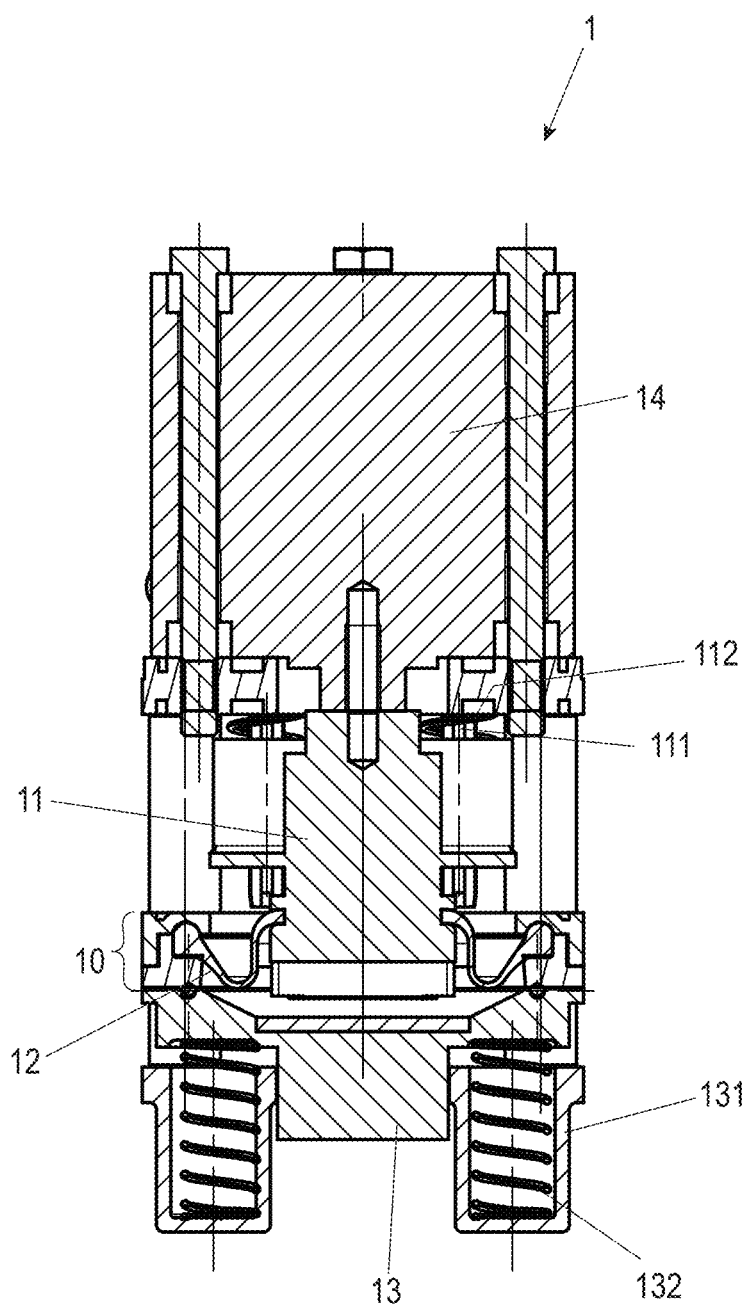

In FIGS. 3a to 3c, the safety valve 1 is shown in the passage position in the same way as in FIGS. 2a to 2c. In this passage position, the actuator 14 is pressurized with compressed air via the compressed air connection 142, so that the piston rod 141 is retracted in the direction of the actuator 14 and accordingly pulls the piston 11 in the direction of the actuator 14.

Moving the piston 11 away from the housing main body 10 moves the sealing surfaces 114, 134 away from the ends of the bores 113, 133. The shut-off valves 2, 4 (compare FIG. 1) are opened accordingly. Due to the movement of the piston 11, no more force is exerted by the piston 11 on the housing cover 13 via the sealing surfaces 114, 134, as a result of which the latter—spring-loaded by the springs 132—is pressed onto the housing main body 10. A circumferential seal 135 is arranged on the edge of the housing cover 13, which rests on an opposite bearing surface of the housing main body 10 and thus seals the housing cover 13 with respect to the housing main body 10. This seal implements the discharge valve 6 according to FIG. 1, which is now closed. Medium introduced through the inlet 3 into the cavity formed between the housing main body 10 and the housing cover 13 can only leave this cavity through the outlet 5.

Figure 4A:
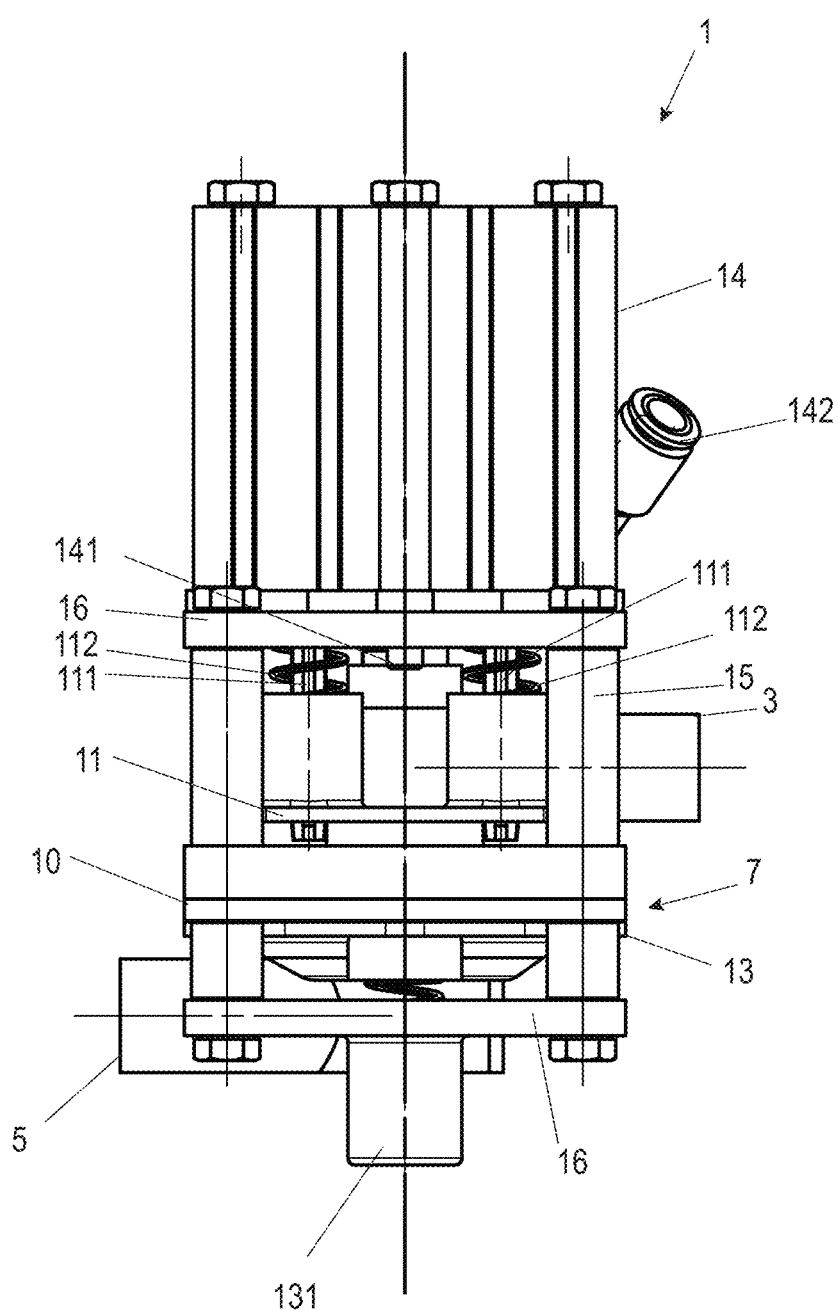
FIGS. 4a to 4c show different views of the safety valve of FIGS. 2a to 2d in a transition position.
Figure 4B:
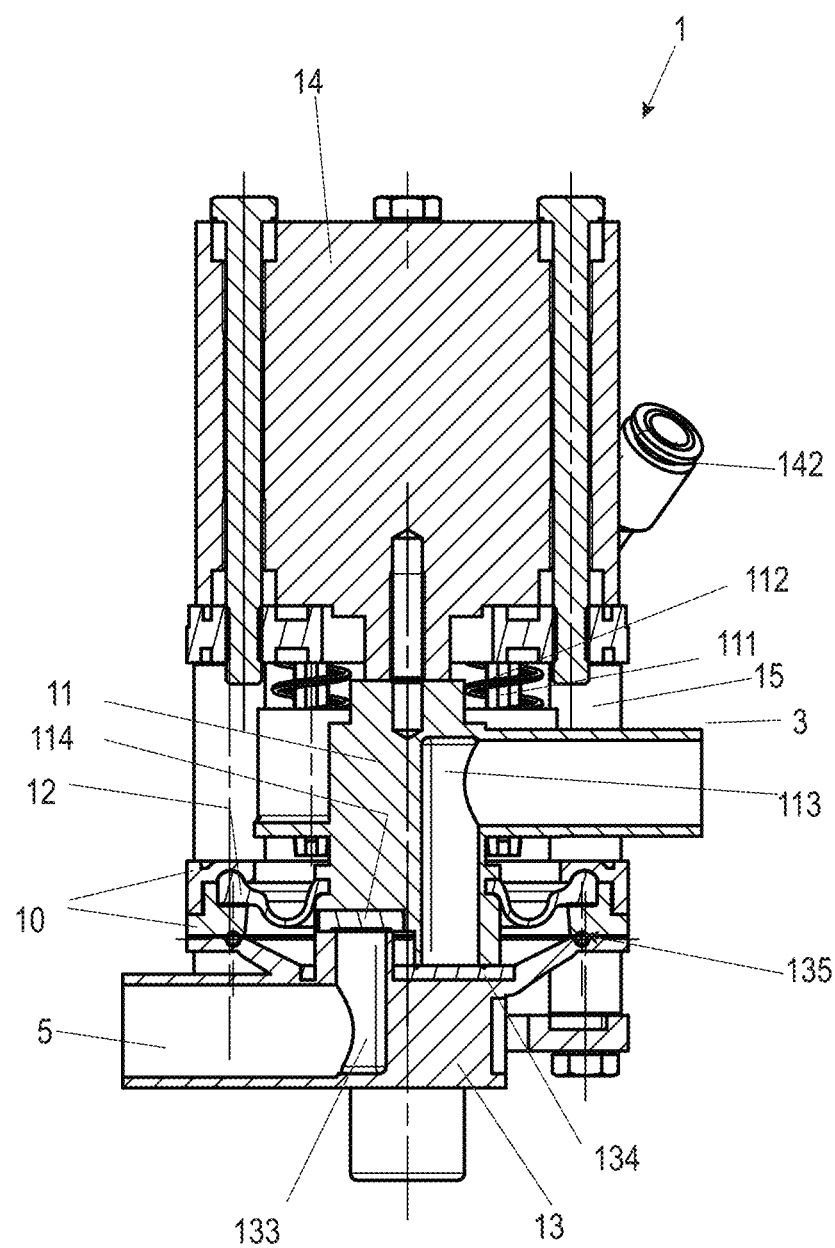
Figure 4C:
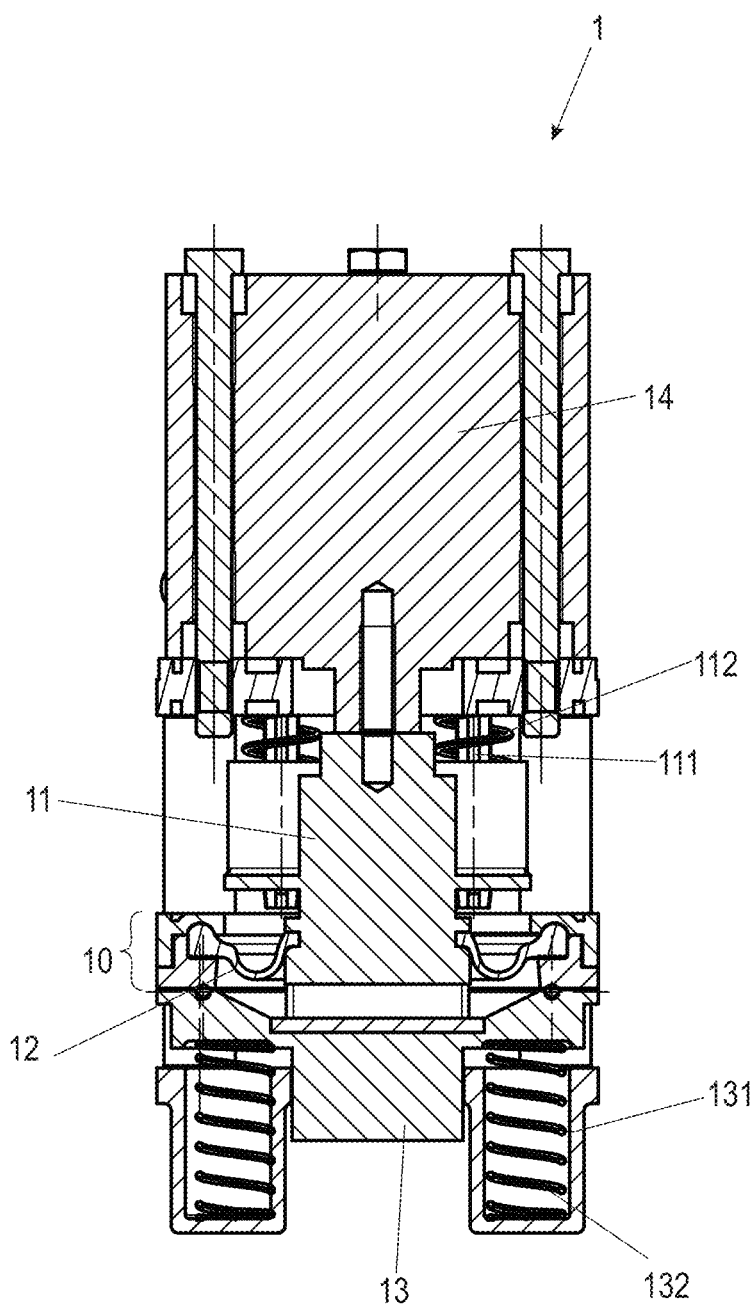

The transition between the shut-off state and the passage state is again shown in FIGS. 4a to 4c in the same way as in FIGS. 2a to 2c and 3a to 3c.

Since force is exerted by the piston 11 on the housing cover 13 via the sealing surfaces 114, 134, opening of the circumferential discharge outlet 7 by lifting the housing cover 13 from the housing main body 10 against the locking force of the springs 132 can only take place when the sealing surfaces 114, 134 close the bores 113, 133. Accordingly, a causality chain is formed by this form of actuation, which ensures that the discharge valve 6 does not open until both shut-off valves 2, 4 are closed.

FIGS. 4a to 4c show a state of the safety valve 1 in which the shut-off valves 2, 4 have just closed or are just still closed, wherein the housing cover 13 already rests on the housing main body 10 and thus the discharge valve 6 is also closed. Starting from this intermediate position, the shut-off valves 2, 4 open if the change from the shut-off state to the passage state takes place and the discharge valve 6 opens if the change from the passage position to the shut-off position takes place.

Figure 5A:
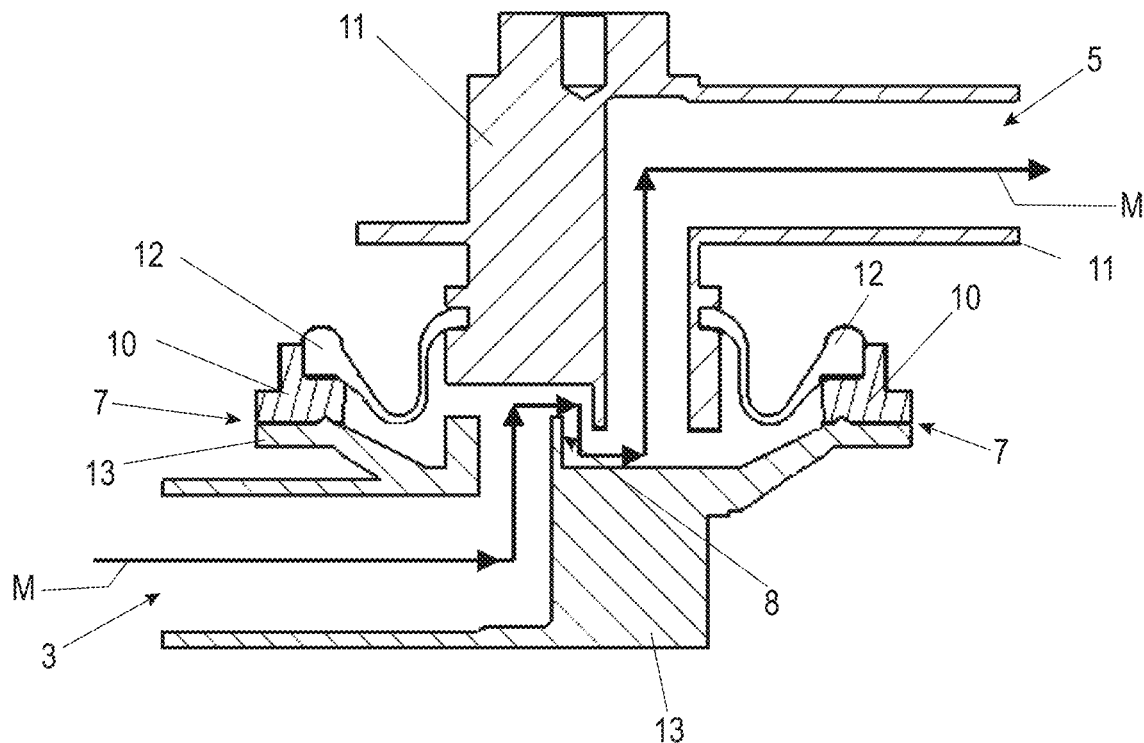
FIGS. 5a to 5c each show a schematic diagram of media-carrying components of the safety valve of FIGS. 2a to 4c in various functional positions.
Figure 5B:
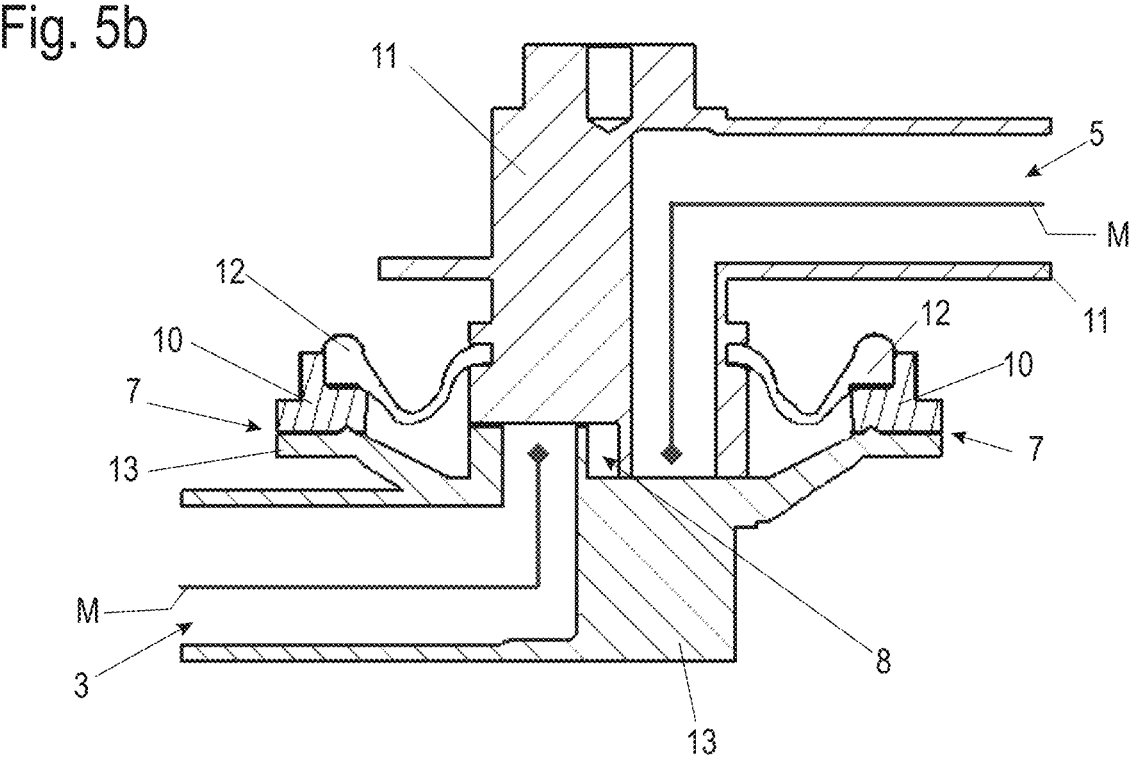
Figure 5C:
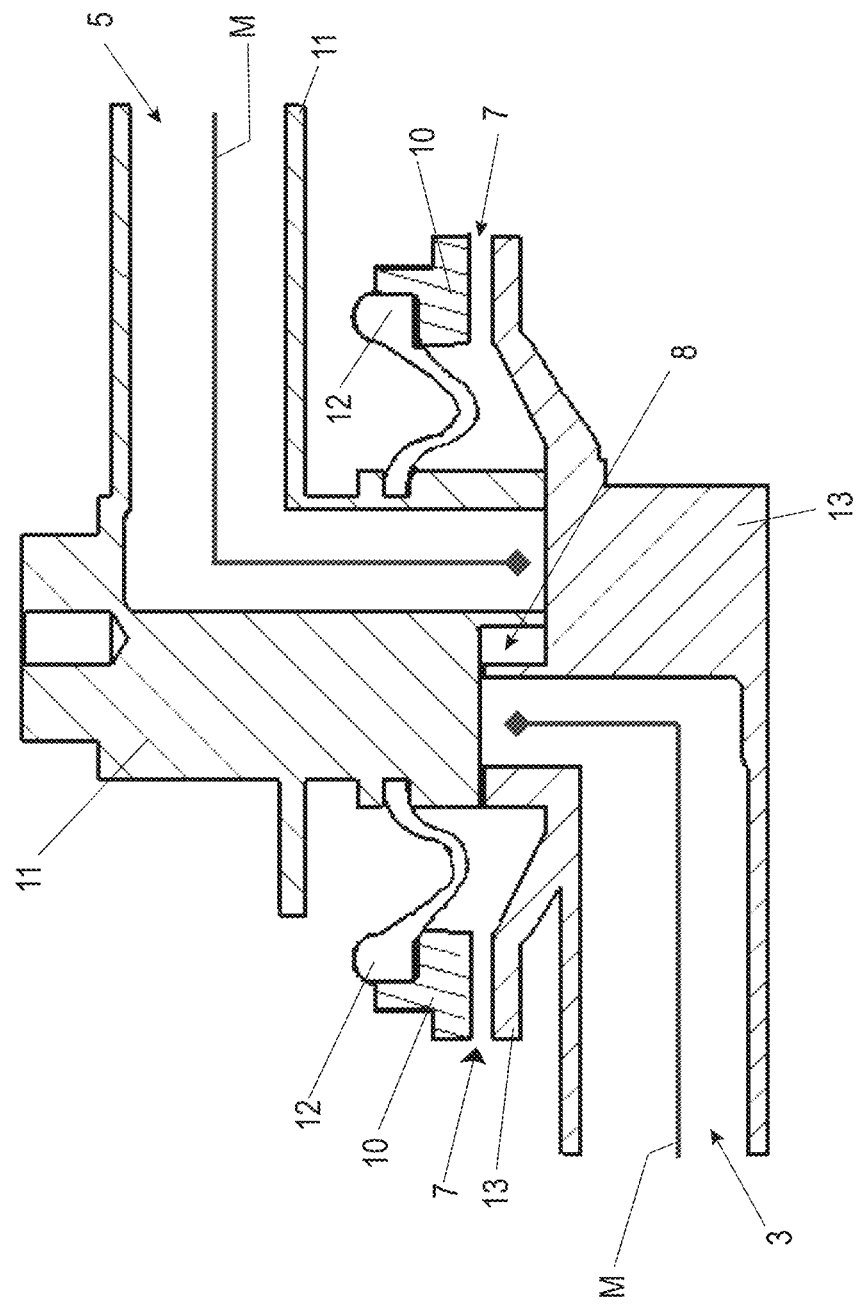

In FIGS. 5a to 5c, sectional drawings of the safety valve 1 of the previous figures are reproduced, with which the mode of operation and the flow of a medium M through the safety valve 1 is again illustrated. For the sake of clarity, only those components of the safety valve 1 are reproduced that are acted upon by the medium M or can come into contact with the medium M during operation. Specifically, these are the piston 11 with the outlet 5, the housing cover 13 with the inlet 3, and the housing main body 10, which is connected to the piston 11 via the diaphragm seal 12.

FIG. 5a shows the safety valve 1 in the passage position and FIG. 5c in the shut-off position. FIG. 5b shows an intermediate position when switching between the passage and shut-off positions.

In the passage position in FIG. 5a, the piston 11 is initially retracted in the direction of the actuator not shown here, as a result of which the housing cover 13 rests circumferentially on the housing main body 10 under spring force. The respective sealing surfaces and bores assigned to each other (not provided with separate reference signs in FIGS. 5a to 5c) are raised from each other so that the medium M can flow from the inlet 3 through the hydraulic connection 8 to the outlet 5. The discharge outlet 7 is closed because the housing cover 13 rests on the housing main body 10.

When the actuator is moved, the piston 11 is pressed in the direction of the housing cover 13, with the associated bores or sealing surfaces lying on top of each other and forming two closed shut-off valves. The discharge outlet 7 is initially still closed in the intermediate position of FIG. 5b.

When the piston 11 moves further, it lifts the housing cover 13 from the housing main body 10. The two shut-off valves remain closed, but the discharge outlet 7 is opened, so that the functionality as a safety valve is given.

Although the invention has been illustrated and described in detail by way of preferred embodiments, the invention is not limited by the examples disclosed, and other variations can be derived from these by the person skilled in the art without leaving the scope of the invention. It is therefore clear that there is a plurality of possible variations. It is also clear that embodiments stated by way of example are only really examples that are not to be seen as limiting the scope, application possibilities or configuration of the invention in any way. In fact, the preceding description and the description of the figures enable the person skilled in the art to implement the exemplary embodiments in concrete manner, wherein, with the knowledge of the disclosed inventive concept, the person skilled in the art is able to undertake various changes, for example, with regard to the functioning or arrangement of individual elements stated in an exemplary embodiment without leaving the scope of the invention, which is defined by the claims and their legal equivalents, such as further explanations in the description.

LIST OF REFERENCE SIGNS

1 Safety valve
2 First shut-off valve
3 Inlet
4 Second shut-off valve
5 Outlet
6 Discharge valve
7 Discharge outlet
8 Hydraulic connection
10 Housing main body
11 Piston
111 Guide rod
112 Spring
113 Bore
114 Sealing surface
12 Diaphragm seal
13 Housing cover
131 Guide dome
132 Spring
133 Bore
134 Sealing surface
135 Seal
14 Actuator
15 Column
16 End plate
M Medium

The invention claimed is:

1. A safety valve, comprising:
an inlet;
an outlet;
two shut-off valves arranged one behind the other; and
a discharge valve with a discharge outlet, wherein the two shut-off valves and the discharge valve are each connected to one another by an inlet and outlet, respectively, wherein, in a passage position, the two shut-off valves are open and the discharge valve is closed, wherein, in a shut-off position, the shut-off valves are closed and the discharge valve is open;
a housing main body relative to which a piston is movably guided;
a housing cover that is movably guided on a side laying opposite the housing main body,
wherein the inlet of the safety valve is arranged on the piston and the outlet of the safety valve is arranged on the housing cover,
wherein the inlet of the safety valve merges into a first bore that is closeable by a first sealing surface arranged on the piston,
wherein the outlet of the safety valve merges into a second bore that is closeable by a second sealing surface arranged on the housing cover,
wherein the main housing body forms a cavity into which the first and second bores terminate, and
wherein the discharge outlet is a circumferential gap formed when the housing cover is lifted off of the main housing body.

2. The safety valve of claim 1, wherein the piston moves in an opening of the housing main body and is connected to the housing main body by a diaphragm seal by which the cavity is sealed to the outside of the safety valve.

3. The safety valve of claim 1, wherein the piston is moveably guided by guide rods in a direction perpendicular to one side of the housing main body.

4. The safety valve of claim 3, wherein the piston is pressed in a direction of the housing main body under a first spring force.

5. The safety valve of claim 4, wherein first springs, which exert the first spring force, are arranged on the guide rods.

6. The safety valve of claim 5, wherein the housing cover is pressed in a direction of the housing main body under a second spring force.

7. The safety valve of claim 6, wherein second springs, which exert the second spring force, are arranged in guide domes and press on the housing cover.

8. The safety valve of claim 7, wherein the first spring force acting on the piston is greater than the second spring force acting on the housing cover.

9. The safety valve of claim 7, wherein the first and second springs are coil springs or gas springs.

10. The safety valve of claim 5, further comprising:
an actuator arranged to move the piston against the first spring force of the first springs.

11. The safety valve of claim 1, wherein media-carrying components of the safety-valve are made of stainless steel or plastic.

12. A method for operating a safety valve in a milking device for milking a milk-producing animal, wherein the safety valve comprises an inlet, an outlet, two shut-off valves arranged one behind the other, and a discharge valve with a discharge outlet, wherein the two shut-off valves and the discharge valve are each connected to one another by an inlet and outlet, respectively, a housing main body relative to which a piston is movably guided, a housing cover that is movably guided on a side laying opposite the housing main body, wherein the inlet of the safety valve is arranged on the piston and the outlet of the safety valve is arranged on the housing cover, wherein the inlet of the safety valve merges into a first bore and the outlet of the safety valve merges into a second bore, wherein the main housing body forms a cavity into which the first and second bores terminate, the method comprising:
configuring the safety valve in a passage position in which the two shut-off valves are open and the discharge valve is closed, wherein in the passage position the first and second bores are open; and
configuring the safety valve in a shut-off position in which the shut-off valves are closed and the discharge valve is open, wherein in the shut-off position the first bore is closed by a first sealing surface arranged on the piston, the second bore is closed by a second sealing surface arranged on the housing cover, and the discharge outlet is opened by lifting the housing cover off of the main body housing to produce a circumferential gap.

\* \* \* \* \*